No. 634,185. Patented Oct. 3, 1899.
H. B. PINNEY.
CONFECTIONERY MACHINE.
(Application filed Mar. 21, 1899.)
(No Model.) 2 Sheets—Sheet 1.
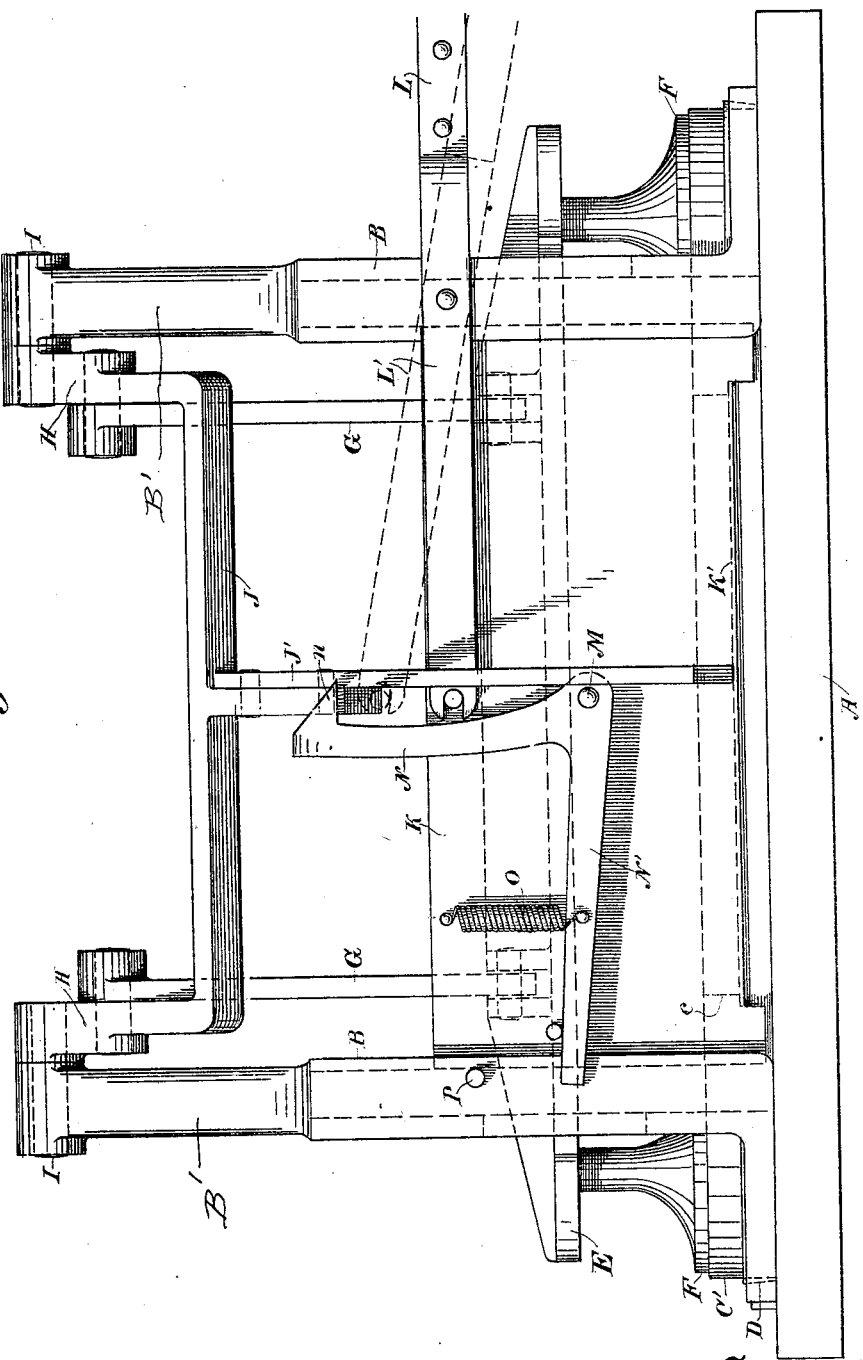
Witnesses,
Inventor,
Henry B. Pinney No. 634,185. Patented Oct. 3, 1899.
H. B. PINNEY.
CONFECTIONERY MACHINE.
(Application filed Mar. 21, 1899.)
(No Model.) 2 Sheets—Sheet 2.
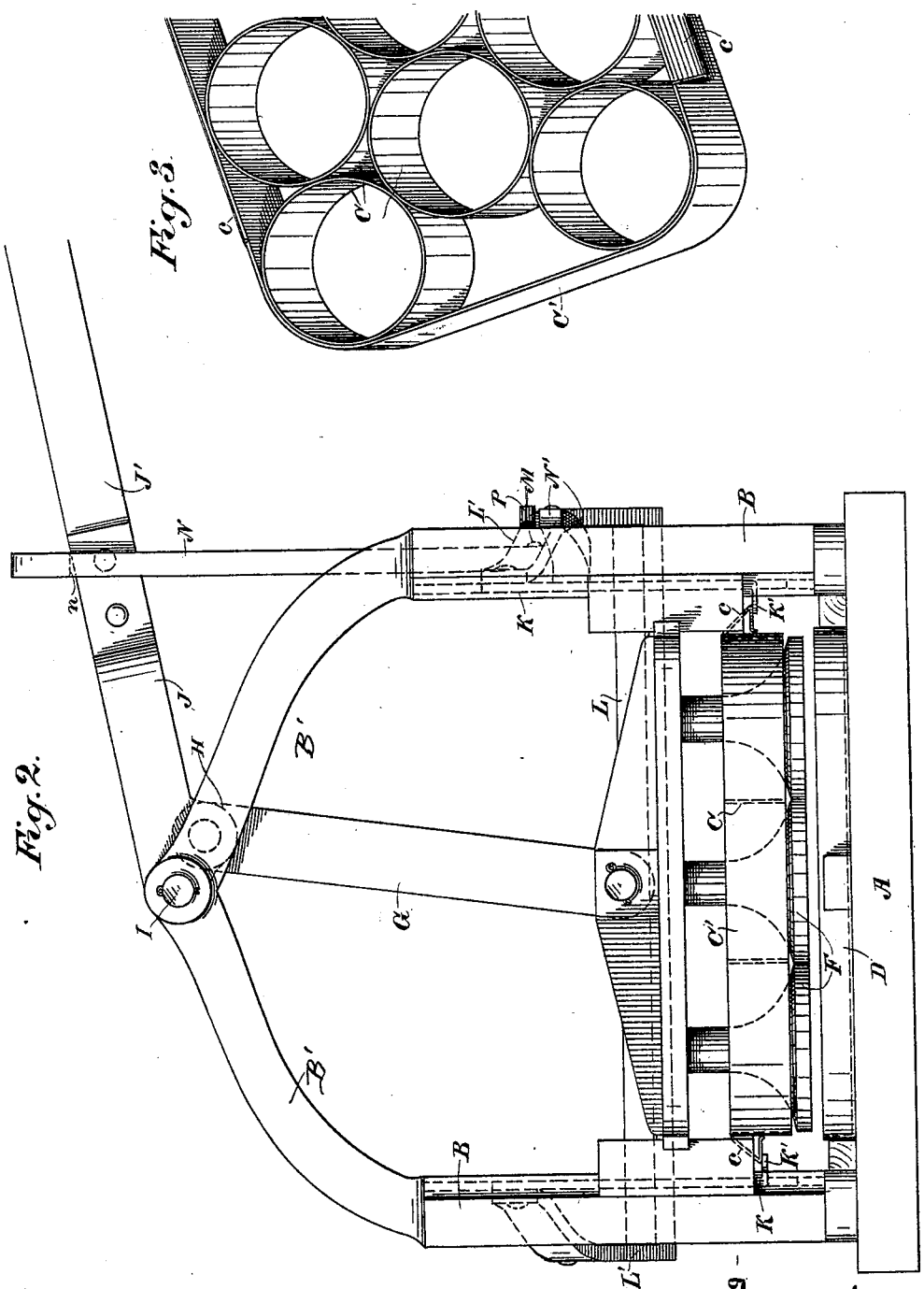

UNITED STATES PATENT OFFICE.

HENRY B. PINNEY, OF OAKLAND, CALIFORNIA.

CONFECTIONERY-MACHINE.

SPECIFICATION forming part of Letters Patent No. 634,185, dated October 3, 1899.

Application filed March 21, 1899. Serial No. 709,928. (No model.)

*To all whom it may concern:*

Be it known that I, HENRY B. PINNEY, a citizen of the United States, residing at Oakland, county of Alameda, State of California, have invented an Improvement in Confectionery-Machines; and I hereby declare the following to be a full, clear, and exact description of the same.

My invention relates to a machine for pressing substances of various kinds that need to be compacted and formed or shaped, and it is especially designed for use in making confectionery, such as popcorn, nuts, or other substances which are mixed with the boiled sugar syrup and are afterward to be compressed into various forms or shapes before hardening.

It consists of a tray with molds of suitable form and size open at top and bottom, a vertically-movable guided plate with plungers corresponding in position with the molds, means for forcing the plungers down to compact the material within the molds, means for raising the plungers, means for raising the bottomless molds while the plungers remain approximately in position until the molds have been raised, so as to disengage the pressed material therefrom into the tray, and means for disengaging the molds and allowing them to drop while continuing the upward motion of the plungers to a point where the tray, the molds, and their contents may be removed and replaced by others.

It also comprises details of construction which will be more fully explained by reference to the accompanying drawings, in which—

Figure 1 is a side elevation of the machine. Fig. 2 is an end view of the same. Fig. 3 is a view of the mold.

A represents a base of any suitable description, having upon it guide-posts B, which, as shown in the present case, are located at each angle, inclosing a rectangular space of sufficient size to receive the trays and the molds containing the material to be compressed. The molds C are here shown as formed with a rectangular exterior frame C', within which they are retained in their relative positions, and this frame has upon its sides projecting flanges c.

D is a tray which is adapted to hold the mold-frame and the contained molds.

E is a guided vertically-movable rectangular plate or frame, having fixed and projecting from the lower surface the plungers F. These plungers are of a diameter and form which would admit of their being introduced into the molds C, and they are fixed upon the plate E so as to be axially coincident with the molds when the latter are in place. The top of the plate E is connected by links G with short crank-arms H, or they may be connected directly with the inner ends of the actuating-levers at points a short distance from and eccentric to the pivot or fulcrum-points I of the levers. The levers comprise a curved yoke J, the ends of which are fulcrumed in the arches B', which form the top and connection between the pairs of posts B, and this yoke has a central handle or lever J', extending outwardly, by the movement of which lever the yoke and lever-arms are turned about their fulcrum-points I, and acting through the eccentrically-connected links G the movement of the lever J' serves to raise or depress the plate E with its plungers F.

When the tray and molds have been placed upon the base A in line beneath the plungers, by pressing down upon the lever J' the plungers will be forced down and the material compacted within the molds. It is then desirable to disengage the material from the molds and to lift the plungers. This is effected as follows: Between the vertical posts B are slidable frames or carriers K, movable in vertical guides or channels on the posts B. These frames or carriers have inwardly-turned lugs or projections K' at the bottom, which are so disposed as to engage with the flanges c upon the mold-carrier C when the frames or carriers K are in their normal position. These lugs or projections K' are sufficiently low to allow the tray and molds to be placed upon the base A, when the flanges c will overhang the lugs or projections K', so that when the frames or carriers K are raised they will also raise the molds. After the lever J' has been pressed down and the plungers introduced into the molds, the molds themselves may be raised, either by means of an independent lever L, connecting by outwardly-curved arms L' with each of the frames or carriers K, or in other ways so arranged that it may be made to lift these slides, and when the slides are lifted by means of the engaging lugs or projections K' and flanges c they will also lift the molds, while the plungers remain in essentially their lowest position, so that they force the compacted material out of the molds as the molds are lifted, after which the molds may be dropped and the plungers raised to allow the molds and tray to be removed. In order to make this operation continuous and without the use of the supplemental lever L, I have shown a bell-crank lever having its angle fulcrumed to one of the frames or carriers K, as shown at M, and the upwardly-projecting arm N of the bell-crank has a hook n projecting over the lever J', as shown. A spring O is attached in any suitable manner so as to act upon the arm N and normally hold the latch n over the lever J'. The other horizontal arm N' of the bell-crank lever projects into line with one of the posts B, as shown, and on that post B is a stop or projection P, for a purpose to be hereinafter described. The operation will then be as follows: After the lever J' has been pressed down and the plungers introduced into the molds to compact the material therein, the lever J' is lifted. It first engages the latch n of the bell-crank lever, and through its connection with the frame or carrier K, by the pivot-pin M and by reason of the two frames or carriers K being connected by the yoke L', the upward movement of the lever J' will lift these frames or carriers simultaneously, and with them the molds, because the lugs or projections K' and flanges c of the frames or carriers and molds will be engaged so that the molds are lifted; but by reason of the less distance that the links G are pivoted from the fulcrum I of the lever J' the plungers projecting beneath the plate E will not be lifted at such a rate of speed as the molds are lifted, because of the greater distance of the latch n from the fulcrum of the lever. As soon as the molds have been lifted sufficiently to clear them of the compacted material the end N' of the bell-crank lever will strike the pin P on the post B, and, the spring O yielding, the latch n will be drawn out of line with the lever J', and this will allow the frames or carriers K and the molds to fall back so that the molds will rest upon the articles which were formed in them and from which they have just been removed. The molds thus dropping upon the material within the tray D will be in readiness to be removed as soon as the plungers are raised sufficiently high to clear the molds. The continued movement of the lever J' after the latch has been disengaged and the molds dropped carries the plungers up to such a height that they will be entirely clear of the molds and the tray with the contained substances, and the molds can be withdrawn and another tray with molds loaded and ready for compression can be inserted. In this way the operation can be carried on rapidly and continuously.

Having thus described my invention, what I claim as new, and desire to secure by Letters Patent, is—

1. A confectionery-machine consisting of a base having guide-posts, a plate guided upon said posts having plungers projecting from the lower face, open-ended molds adapted to fit in line beneath the plungers, a yoke-lever, and links connecting said lever with the plunger-plate whereby the latter may be raised or depressed, frames or carriers vertically movable and guided by the corner-posts having inwardly-turned lower edges, correspondingly-projecting flanges upon the mold-carrying frame whereby the raising of the frames or carriers independently of the movement of the plungers will disengage the mold from the compacted material.

2. In a confectionery-machine, a base having guide-posts, a plunger-carrying plate slidable between and guided by said posts, a lever fulcrumed above connected by links with the plunger-plate, molds having open top and bottom, and a surrounding frame adapted to fit in line beneath the plungers whereby material contained in the molds may be compacted, flanges projecting from the side of the mold-frame, vertically-movable guided frames or carriers having inwardly-turned flanges which engage the flanges of the molds and a lever mechanism by which the slides and molds may be raised while the plungers remain resting upon the material which has been pressed in the molds.

3. In a confectionery-machine, a base with guide-posts, a plate vertically movable and guided by said posts, plungers projecting from the lower face of said plate, molds coincident with the plungers having an inclosing frame with outwardly-projecting flanges, frames or carriers guided by the posts having inwardly-turned flanges which engage those of the molds from below, a lever having the inner ends fulcrumed, connections between the lever and the plunger-plate whereby the latter is depressed or raised, a latch fulcrumed to and movable with the frames or carriers and having a hook adapted to engage the plunger-moving lever at a greater distance from its fulcrum than that of the plunger-plate whereby the frames or carriers and the mold are first raised above the material which has been molded while the plungers act to force the material out of the molds and clear thereof.

4. In a confectionery-machine, a base having vertical guide-posts, a plate vertically guided by said posts having plungers projecting from the lower surface, a series of molds with an inclosing band or rim, said band having outwardly-projecting flanges upon each side, vertically-movable guided frames or carriers with inwardly-turned lower edges adapted to engage with the flanges of the molds, a fulcrumed lever having links connecting it with the plunger-plate whereby the latter and the plungers are depressed or raised, a bell-crank lever pivoted to the vertically-movable frames or carriers having a latch upon one of its arms which normally projects over and engages the lever by which the plungers are moved and at a greater distance from the fulcrum than the connections of the plunger-plate, whereby the molds are raised and disengaged from the compressed material while the plungers retain it in position, a stop against which the other arm of the bell-crank lever contacts after the molds have been thus raised, whereby the latch is disengaged from the actuating-lever and the molds allowed to fall to their normal position while the continued upward movement of the lever raises the plungers clear of all obstructions.

In witness whereof I have hereunto set my hand.

HENRY B. PINNEY.

Witnesses:
F. J. WOODWARD,
C. B. TACKLE.